United States Patent
Fix (10) Patent No.: US 12,053,125 B1
(45) Date of Patent: Aug. 6, 2024

(54) PISTACHIO SPLITTER

(71) Applicant: Allan W. Fix, Minneapolis, MN (US)

(72) Inventor: Allan W. Fix, Minneapolis, MN (US)

(73) Assignee: Allan W. Fix, Minneapolis, MN (US)

( * ) Notice: Subject to any disclaimer, the term of this patent is extended or adjusted under 35 U.S.C. 154(b) by 0 days.

(21) Appl. No.: 18/306,575

(22) Filed: Apr. 25, 2023

(51) Int. Cl.
*A47J 43/26* (2006.01)

(52) U.S. Cl.
CPC ..................... *A47J 43/26* (2013.01)

(58) Field of Classification Search
CPC ............. A47J 43/26; A47J 23/00; B25B 7/00; B25B 17/00; B25B 17/003
USPC ........... 30/120.1, 120.2, 120.3, 120.4, 120.5, 30/113.1, 113.2, 113.3, 28, 29, 120, 142, 30/253, 315; 99/498
See application file for complete search history.

(56) References Cited

U.S. PATENT DOCUMENTS

| | | | | |
|---|---|---|---|---|
| 883,558 A * | 3/1908 | Moy | ..................... | A47J 43/26 29/268 |
| 3,148,718 A * | 9/1964 | Plott | ..................... | A47J 43/26 30/120.3 |
| 3,494,397 A * | 2/1970 | Sparks | ..................... | A47J 43/14 D7/693 |
| 4,462,156 A | 7/1984 | Himelhoch | | |
| 4,787,307 A * | 11/1988 | Rollband | ................ | A47J 43/26 99/582 |
| 8,387,260 B2 | 3/2013 | Quentin | | |
| 8,819,941 B2 | 9/2014 | Mensch | | |
| 9,770,136 B1 * | 9/2017 | Muth | ..................... | A47J 43/26 |
| 2005/0235496 A1 | 10/2005 | Shagday et al. | | |
| 2006/0260134 A1 * | 11/2006 | Kolano | ................... | A47J 43/14 30/120.1 |

OTHER PUBLICATIONS

"Woiwo Fruit Splitter Stainless Steel Denucleation Tool Apple Slicer", downloaded Apr. 4, 2023 from https://www.amazon.com/vndeful-Splitter-Stainless-Denucleation-Slicer/dp/B078SS3K9Y.
"Poweroy Nutcrackers for Nuts, Cartoon Squirrel Design, Made of Alloy, Nut Cracker Pecan Walnut Plier is Suitable for Cracking Almonds, Pecans and other Nuts.Yellow", downloaded Apr. 4, 2023 from https://www.amazon.sg/Nutcrackers-Squirrel-Suitable-Cracking-Nuts-Yellow/dp/B08R1QHT8P.

(Continued)

*Primary Examiner* — Ghassem Alie (57) ABSTRACT

A pistachio splitter includes a base extending along orthogonal first and second directions; and first and second extended portions extending from the base along a third direction orthogonal to the first and second directions. The first and second extended portions are spaced apart along the first direction to define a gap therebetween. Each of the first and second extended portions include opposing major surfaces spaced apart along the second direction and sloped toward one another along the third direction; and sidewalls extending between and connecting the opposing major surfaces. The sidewalls include a first sidewall of the first extended portion facing the second extended portion and a second sidewall of the second extended portion facing the first extended portion. Each of the first and second sidewalls can define a groove therein extending along the third direction.

20 Claims, 6 Drawing Sheets

(56) References Cited

OTHER PUBLICATIONS

"Spudger Opening Pry Tool Pistachio Opener Anti-static Thin Flexible Stainless . . . 6949639103567 | eBay", downloaded Apr. 3, 2023 from https://www.ebay.com/itm/144975747132.

"Ropto Oyster Clam Opener Machine Tool Oyster Shucker Tool Set—Oyster Shucking Knife Board Seafood Opener Tool Set", downloaded Apr. 4, 2023 from https://www.amazon.com/Oyster-Shucker-Set-Opener-Family/dp/B08N8TJSS5.

"Harveast Hand Crank Nutcracker Tool for Hazelnuts, Nut Cracker for All Nuts, Pistachios and Filbert Nuts, Brazil Nuts, Almond, Nut Crackers, Portable, Adjustable, All Metal—Black", downloaded Apr. 4, 2023 from https://www.amazon.com/Harveast-Nutcracker-Hazelnuts-Pistachios-Adjustable/dp/B0BMZLYQKY.

"One PistachiOpener—(1) Pistachio Nut Opener—With just a pinch they Pop!", downloaded Apr. 4, 2023 from https://www.amazon.com/exec/obidos/asin/B00KSZDSBU.

"Pistachio Opener—Fante's Kitchen Shop—Since 1906", downloaded Apr. 4, 2023 from https://fantes.com/pistachio-opener.

\* cited by examiner

PISTACHIO SPLITTER

TECHNICAL FIELD

The present description relates generally to pistachio splitters.

BACKGROUND

A pistachio typically includes a pistachio nut between two pistachio shells where the pistachio shells form opposing closed and open ends of the pistachio. The pistachio shells are typically removed from the pistachio nut before the nut is eaten.

SUMMARY

In some aspects, the present description provides a pistachio splitter including a base extending along orthogonal first and second directions; and first and second extended portions extending from the base along a third direction orthogonal to the first and second directions. The first and second extended portions are spaced apart along the first direction to define a gap therebetween. Each of the first and second extended portions include opposing major surfaces spaced apart along the second direction and sloped toward one another along the third direction; and sidewalls extending between and connecting the opposing major surfaces. The sidewalls include a first sidewall of the first extended portion facing the second extended portion and a second sidewall of the second extended portion facing the first extended portion. Each of the first and second sidewalls can define a groove therein extending along the third direction. The pistachio splitter is configured such that when a pistachio is inserted into a top portion of the gap opposite the base with an open end of the pistachio facing the base and the pistachio is pushed into the gap toward the base, the opposing major surfaces of the first and second extended portions pry apart shells of the pistachio and the grooves in the first and second sidewalls can receive edges of a nut of the pistachio.

In some aspects, the present description provides a pistachio splitter including a base extending along orthogonal first and second directions; and first and second extended portions extending from the base of the pistachio splitter along a third direction orthogonal to the first and second directions. The first and second extended portions of the pistachio splitter are spaced apart along the first direction to define a gap therebetween. The base can define a recess therein disposed between the first and second extended portions. Each of the first and second extended portions include opposing major surfaces spaced apart along the second direction and sloped toward one another along the third direction; and sidewalls extending between and connecting the opposing major surfaces. The sidewalls include a first sidewall of the first extended portion facing the second extended portion and a second sidewall of the second extended portion facing the first extended portion. Each of the first and second sidewalls can define a groove therein extending along the third direction. The gap can have a width along the first direction in a range of about 4 mm to about 10 mm. The gap can have a height along the third direction in a range of about 14 mm to about 22 mm. For each of the first and second extended portions, the opposing major surfaces define an acute angle therebetween. The acute angle can be in a range of about 18 degrees to about 29 degrees.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

FIGS. 1-4 are schematic top perspective, side, end, and top views, respectively, of a pistachio splitter 100, according to some embodiments. In some embodiments, a pistachio splitter 100 includes a base 110 extending along orthogonal first and second directions (x- and y-directions); and first and second extended portions 120 and 122 extending from the base along a third direction (z-direction) orthogonal to the first and second directions. The first and second extended portions 120 and 122 are spaced apart along the first direction to define a gap 121 therebetween. Each of the first and second extended portions 120 and 122 include opposing major surfaces 131 and 132 spaced apart along the second direction and sloped toward one another along the third direction; and sidewalls extending between and connecting the opposing major surfaces. The sidewalls include a first sidewall 135 of the first extended portion 120 facing the second extended portion 122 and a second sidewall 136 of the second extended portion 122 facing the first extended portion 120. In some embodiments, each of the first and second sidewalls define a groove 137 therein extending along the third direction.

Figure 5:
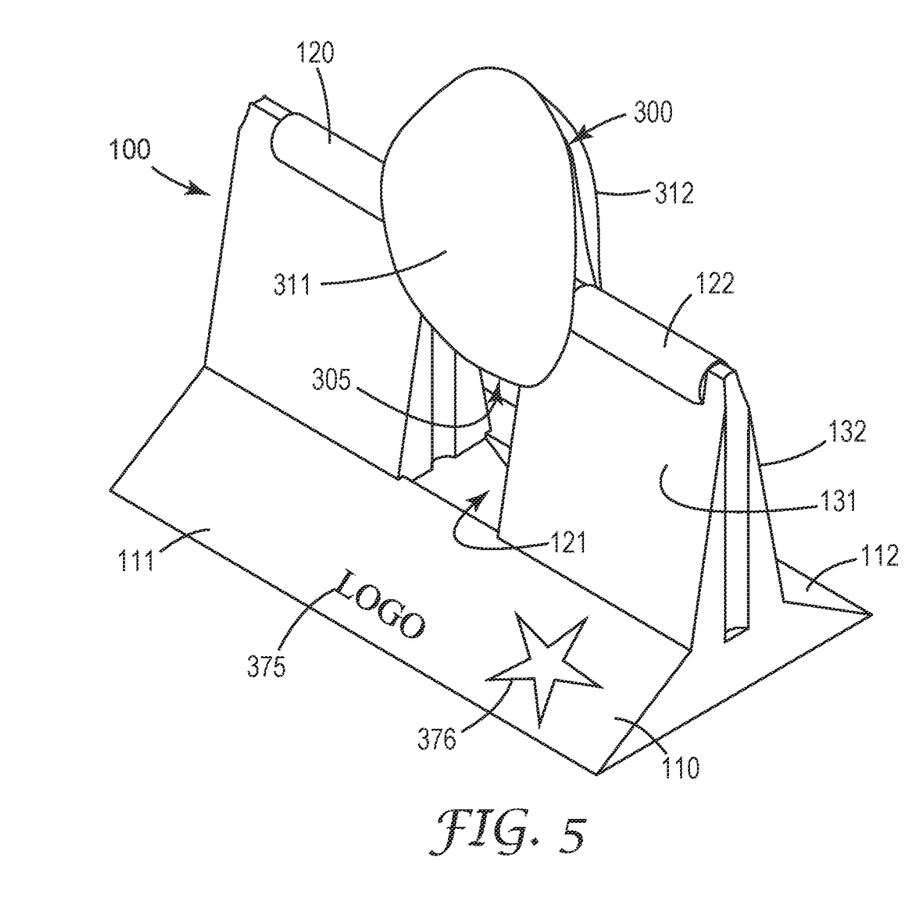
FIG. 5 is a schematic top perspective view of a pistachio splitter with a pistachio inserted into a top portion of a gap between extended portions of the pistachio splitter, according to some embodiments.
Figure 6:
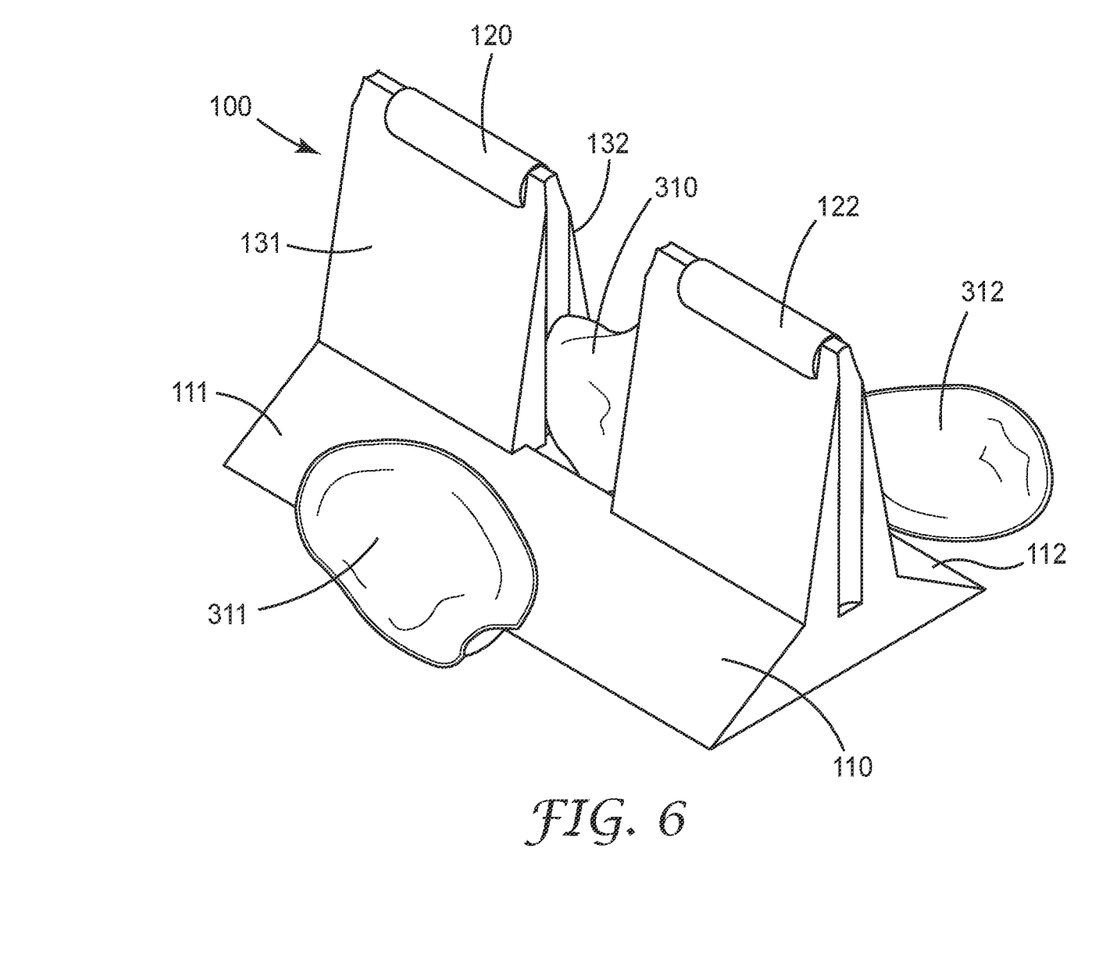
FIG. 6 is a schematic top perspective view of a pistachio splitter with a nut of a pistachio disposed between extended portions of the pistachio splitter, according to some embodiments.

FIG. 5 is a schematic top perspective view of a pistachio splitter 100 with a pistachio 300 inserted into a top portion of the gap 121 between the extended portions 120 and 122 of the pistachio splitter 100, according to some embodiments. FIG. 6 is a schematic top perspective view of a pistachio splitter 100 with a nut 310 of a pistachio disposed between extended portions 120 and 122 of the pistachio splitter, according to some embodiments. In some embodiments, the pistachio splitter 100 is configured such that when a pistachio 300 is inserted into a top portion of the gap 121 opposite the base 110 with an open end 305 of the pistachio 300 facing the base 110 (see, e.g., FIG. 5) and the pistachio 300 is pushed into the gap 121 toward the base 110, the opposing major surfaces 131 and 132 of the first and second extended portions 120 and 122 pry apart shells 311 and 312 of the pistachio 300 and the grooves 137 in the first and second sidewalls 135 and 136 receive edges of a nut 310 of the pistachio 300 (see, e.g., FIG. 6). For example, various dimensions of the pistachio splitter can be selected so that the pistachio splitter separates the shells 311 and 312 from the nut 310 when pistachio 300 is pushed into the pistachio splitter along at least most of a height of the gap 121.

The gap 121 typically has a width W (see, e.g., FIG. 2) along the first direction (x-direction) that is comparable to an average width of pistachios so that the nut 310 (see, e.g., FIG. 6) can be positioned in the gap 121 with edges of the nut 310 near or contacting each of the sidewalls 135 and 136. In some embodiments, the gap 121 has a width W along the first direction in a range of about 4 mm to about 10 mm, or about 5 mm to about 9 mm, or about 6 mm to about 8 mm, or the width W can be about 7 mm, for example. The gap can have a height H (see, e.g., FIG. 2) along the third direction and the opposing major surfaces 131 and 131 can define an acute angle α therebetween (see, e.g., FIG. 3). The height H and the angle α are typically selected so that when the pistachio 300 is pushed into the gap 121 toward the base 110 along a distance comparable to the height H, the angle α is such that the opposing major surfaces 131 and 132 of the first and second extended portions 120 and 122 can pry apart shells 311 and 312 of the pistachio 300. In some embodiments, the gap has a height H along the third direction in a range of about 14 mm to about 22 mm, or about 15 mm to about 21 mm, or about 16 mm to about 20 mm, for example. In some embodiments, for each of the first and second extended portions 120 and 122, the opposing major surfaces 131 and 132 define an acute angle α therebetween where the acute angle is in a range of about 18 degrees to about 29 degrees, or about 19 degrees to about 28 degrees, or about to about 27 degrees, or about 21 degrees to about 26 degrees, for example.

Figure 1:
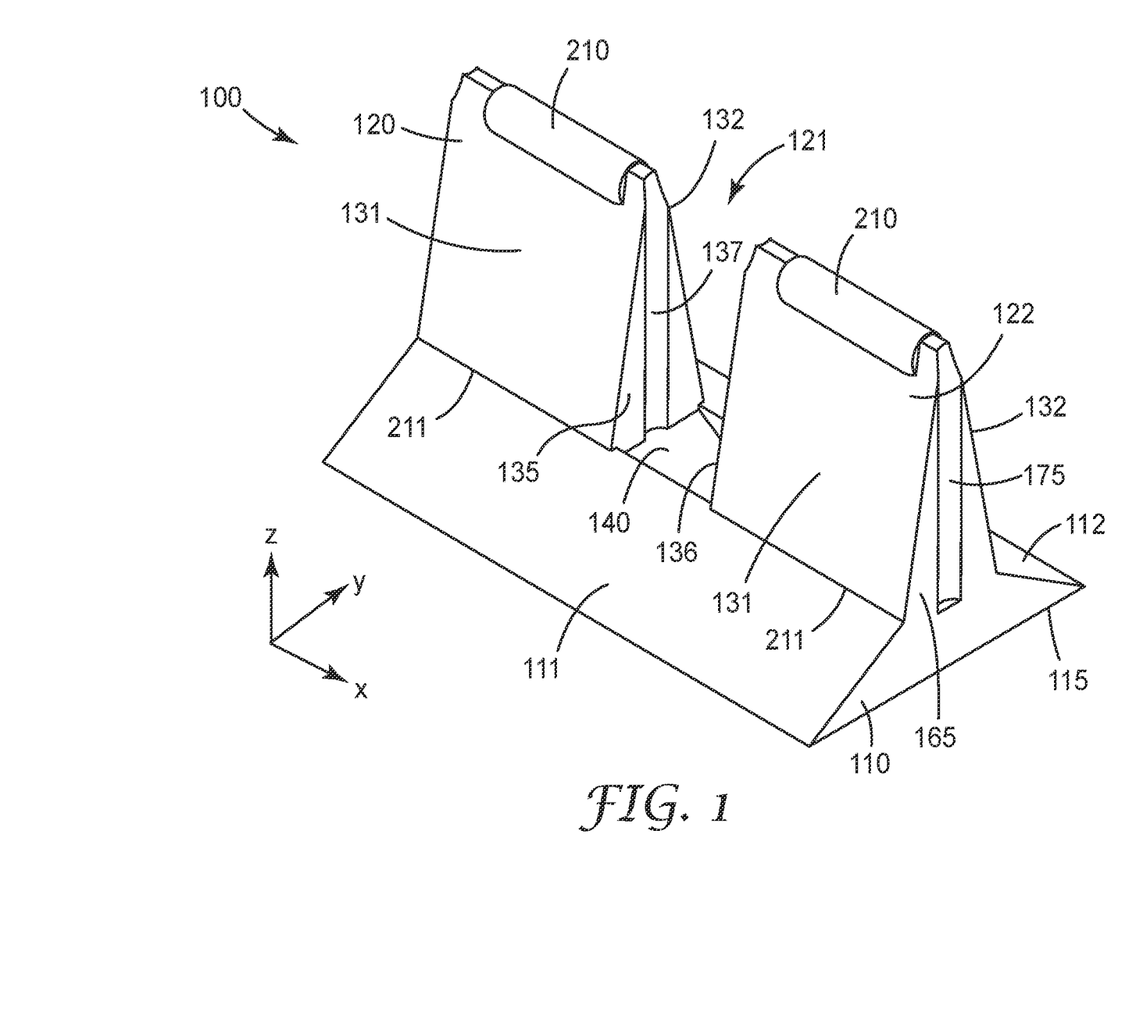
FIG. 1 is a schematic top perspective view of a pistachio splitter, according to some embodiments.

In some embodiments, the base 110 has a bottom major surface 115 and opposing first and second side 111 and 112 surfaces coextensive with the bottom major surface along the first direction (x-direction) and sloping upward (along z-direction) from the bottom major surface 115 (see, e.g., FIGS. 1 and 3) to a bottom 211 of each of the first and second extended portions 120 and 122 (see, e.g., FIG. 1). The dimensions of the base 110 can be such that the pistachio splitter 100 is suitably stable when placed on a flat surface (e.g., of a table) and a pistachio 300 is pushed into the gap 121, for example. The base 110 can have a length Lt (see, e.g., FIG. 4) in the first direction (x-direction), and a depth Dt (see, e.g., FIG. 4) in the second direction (y-direction). The length Lt and the depth Dt can be a total length and a total depth, respectively, of the pistachio splitter 100. In some embodiments, Dt is in a range of about 18 mm to about 30 mm, or about 20 mm to about 28 mm, or about 22 mm to about 26 mm, for example. In some embodiments, Lt is in a range of about 29 mm to about 55 mm, or about 34 mm to about 50 mm, or about 37 mm to about 47 mm, for example.

Figure 2:
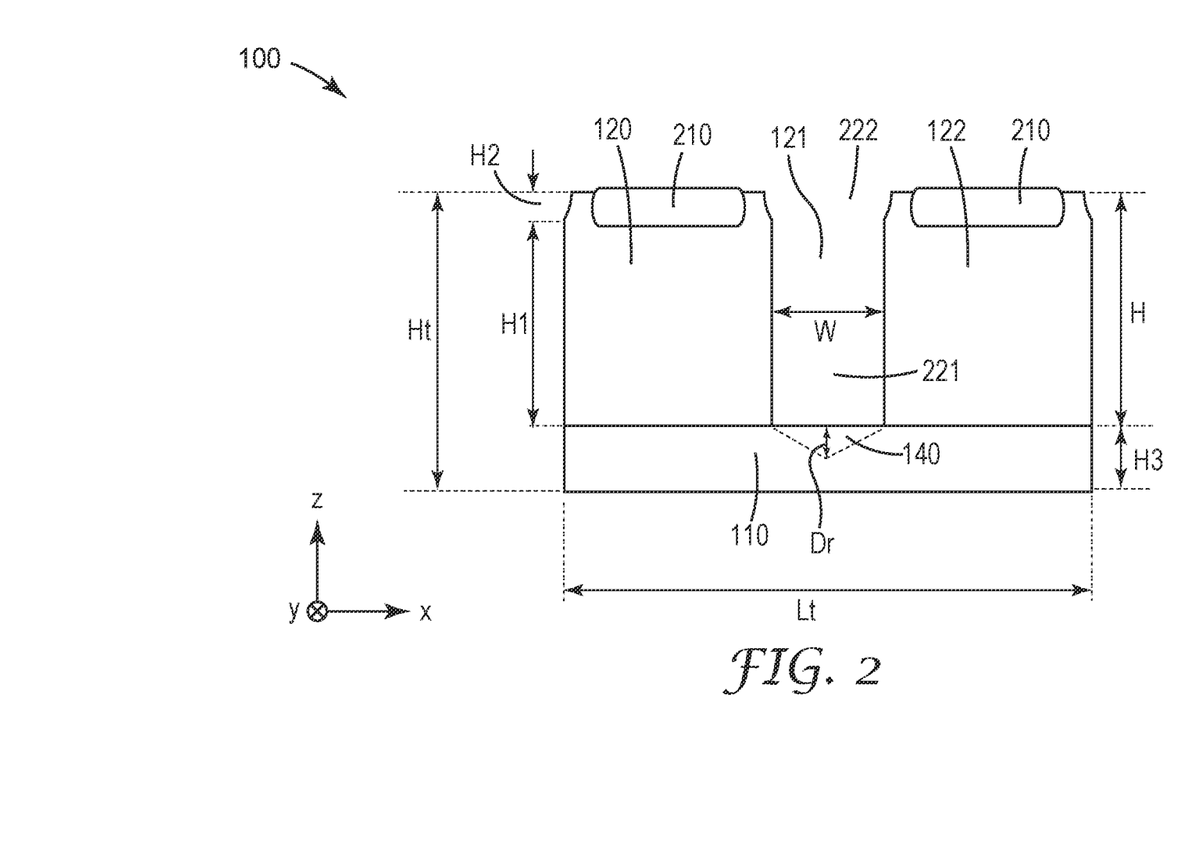
FIG. 2 is a schematic side view of a pistachio splitter, according to some embodiments.
Figure 3:
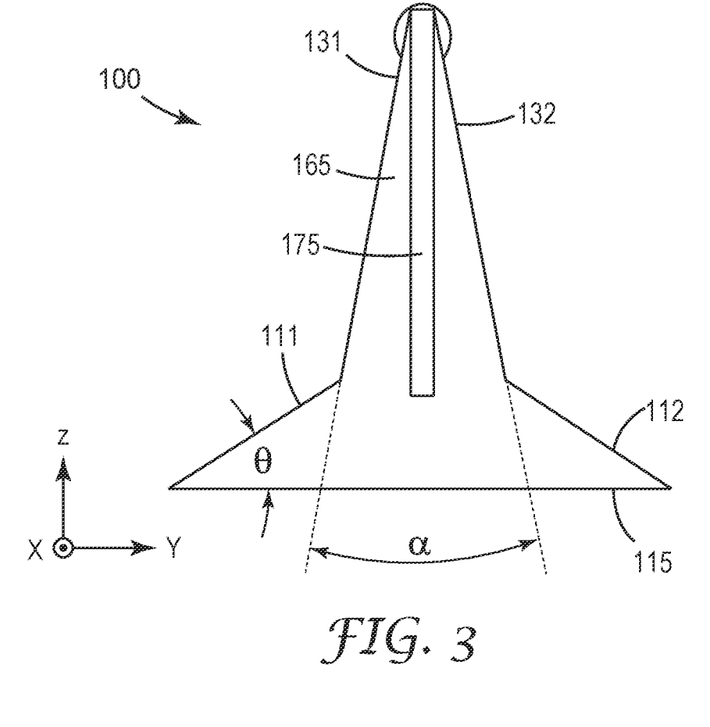
FIG. 3 is a schematic end view of a pistachio splitter, according to some embodiments.
Figure 4:
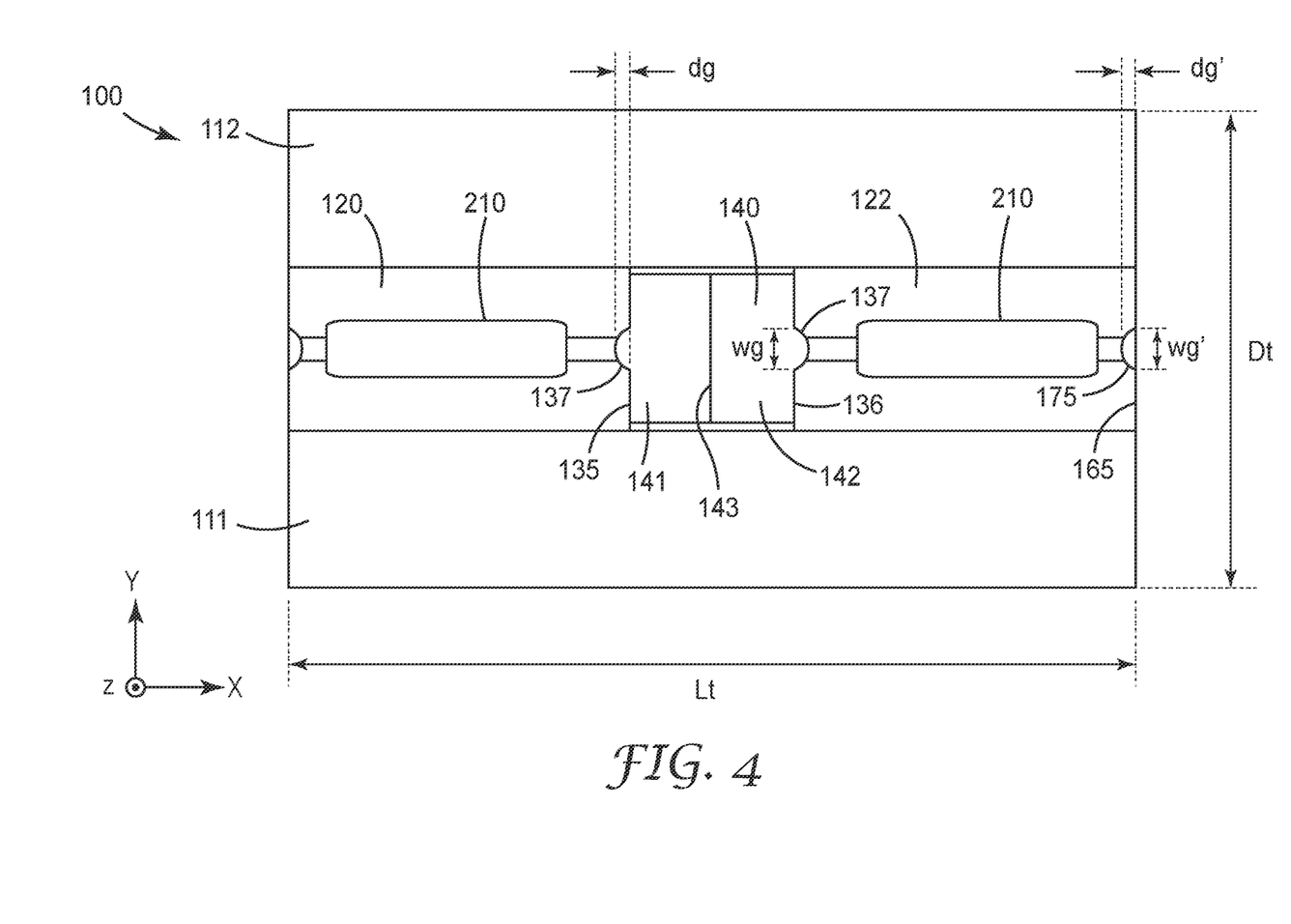
FIG. 4 is a schematic end view of a pistachio splitter, according to some embodiments.

In some embodiments, each of the first and second side surfaces 111 and 112 defines an (e.g., acute) angle θ with the bottom major surface 115 (see, e.g., FIG. 3). The base 110 can have a height H3 along the third direction (see, e.g., FIG. 2). The angle θ and/or the height H3 may be selected to aid in separating the shells 311 and 312 of the pistachio 300 and/or in guiding the shells 311 and 312 away from the nut 310 (see, e.g., FIGS. 5-6). In some embodiments, the angle θ is in a range of about 10 degrees to about 50 degrees, or about 15 degrees to about 45 degrees, or about degrees to about 40 degrees, or about 25 degrees to about 35 degrees, for example. In some embodiments, H3 is in a range of about 3.5 mm to about 7 mm, or about 4 to about 6.5 mm, for example.

The pistachio splitter 100 can have a total height Ht (see, e.g., FIG. 2) in the third direction (z-direction). In some embodiments, Ht is in a range of about 18 mm to about 30 mm, or about 20 mm to about 28 mm, or about 22 mm to about 26 mm, for example.

In some embodiments, the gap 121 has a bottom portion 221 adjacent the base 110 and an opposite top portion 222 (see, e.g., FIG. 2). The bottom portion 221 can have a substantially constant width W. The substantially constant width can be constant up to ordinary manufacturing variations and/or sufficiently close to constant that any variation in the width has a negligible effect on the performance of the pistachio splitter. The variation in the width can be less than about 10, 5, 3, or 2 percent, for example. The top portion 222 can have an outwardly sloping width increasing from the substantially constant width along the third direction (z-direction). The top portion 222 can have an outwardly sloping width in order to help guide the pistachio 300 into the gap 121, for example. In some embodiments, the bottom portion 221 has a height H1 along the third direction at least 2, or 3, or 4 times greater than a height H2 along the third direction of the top portion 222. H2/H1 can be up to 100, 80, 60, 40, or 20, for example.

The height H of the gap 121 is generally measured from a top of the base 110 (or the bottoms 211 of the extended portions 120 and 122) to a top of the gap 121. The height of the groove 137 along the third direction can be equal to or approximately equal to H1.

In some embodiments, the base 110 defines a recess 140 (see, e.g., FIGS. 1, 2, 4) therein disposed between the first and second extended portions 120 and 122 and configured to receive a tip of the pistachio nut 310 when the pistachio 300 is pushed into the gap 121 toward the base 110 (see, e.g., FIG. 6). In some embodiments, a bottom surface of the recess 140 includes first and second substantially planar facets 141 and 142 (see, e.g., FIG. 4) meeting along a common edge 143 extending substantially linearly along the second direction (y-direction). Substantially planar facets can be nominally planar and/or planar up to variations small (e.g., less than 10 or 5%) compared to a largest extent of the facet, for example. An edge extending substantially linearly can extend nominally linearly or linearly up to variations small (e.g., less than 10 or 5%) compared to a maximum length of the edge, for example. The recess 140 can alternatively have other suitable shapes such as a shape of a portion of an ellipsoid, for example. In some embodiments, the recess 140 has a maximum depth Dr (dimension along z-direction; see, e.g., FIG. 2) in a range in a range of about 2 mm to about 5 mm, or about 2.5 mm to about 4 mm, for example. In some embodiments, Dr is at least about 10, 20, 30, or 40 percent of H3. In some embodiments, Dr is no more than about 95, 90, or 80 percent of H3.

In some embodiments, the groove 137 of each of the first and second sidewalls 135 and 136 (see, e.g., FIGS. 1 and 4) has a width wg (see, e.g., FIG. 4) along the second direction (y-direction) in a range of about 1.3 mm to about 2.1 mm, or about 1.4 mm to about 2 mm, or about 1.5 mm to about 1.9 mm, or about 1.6 mm to about 1.8 mm. In some embodiments, the groove 137 of each of the first and second sidewalls 135 and 136 has a depth dg (see, e.g., FIG. 4) along the first direction (x-direction) greater than about 0.3, 0.35, 0.4, 0.45, 0.5, 0.55, 0.6, or 0.65 mm. In some embodiments, the depth dg along the first direction of the groove 137 of each of the first and second sidewalls 135 and 136 is less than about 0.7, 0.65, 0.6, 0.55, 0.5, 0.45 times the width wg of the groove along the second direction. In some embodiments, the depth dg along the first direction of the groove 137 of each of the first and second sidewalls 135 and 136 is less than about 1.3, 1.2, 1.1, 1, 0.9, 0.85, 0.8, or 0.75 mm.

In some embodiments, the sidewalls of at least one of the first and second extended portions 120 and 122 includes an outer sidewall 165 opposite the gap 121 (see, e.g., FIGS. 1 and 4), where the outer sidewall 165 defines a groove 175 therein extending along the third direction (z-direction). The groove 175 can have width wg' (see, e.g., FIG. 4), depth dg' (see, e.g., FIG. 4), and/or height (e.g., corresponding to H1 depicted in FIG. 2). The width wg' and depth dg' can be about the same as the respective width wg and depth dg and/or can be in any of the respective ranges described elsewhere herein for wg and dg. The groove 175 can be included for receiving an edge of a nut of a pistachio. In some cases, a pistachio may be only partially open so that it is closed or mostly closed on one side. In such cases, the pistachio may be split by pushing the pistachio down along the outer sidewall 165 with the open side of the partially open pistachio facing the outer sidewall 165, and with the groove 175 receiving an edge of the nut of the pistachio, so that the major surfaces 131 and 132 can pry the shells of the pistachio apart.

In some embodiments, each of the first and second extended portions 120 and 122 extend from the base along the third direction to a top portion of the extended portion, where the top portion includes a rounded feature 210 extending between and connecting the first and second major surfaces 131 and 132 (see, e.g., FIG. 1). The rounded feature 210 can be included to reduce snagging, abrading or cutting of an adjacent article or a user's hand, for example, due to sharp edges at the tops of the extended portions 120 and 122. The rounded feature 210 of each of the each of the first and second extended portions 120 and 122 can have a length along the first direction that is less than a length long the first direction of the extended portion. The rounded feature 210 of each of the each of the first and second extended portions 120 and 122 can have a width along the second direction that is greater than a width along the second direction of a top portion of the extended portion that is adjacent to the rounded feature 201.

In some embodiments, at least one of the first and second side surfaces (e.g., side surface 111 of FIG. 5) includes one or more indicia 375, 376 thereon. The one or more indicia can include a logo 375 and/or a symbol 376, for example. The one or more indicia can be included to provide a company's logo for advertising purposes, for example. The one or more indicia can be formed on the side surface(s) when the pistachio splitter 100 is made or the one or more indicia can be added after the pistachio splitter 100 has been made (e.g., via printing or engraving, for example).

In some embodiments, a method is provided of separating shells 311 and 312 of a pistachio 300 from a nut 310 of the pistachio 300 using a pistachio splitter 100 described herein (see, e.g., FIGS. 5-6). The method includes inserting the pistachio 300 into a top portion of the gap 121 opposite the base 110 with an open end 305 of the pistachio facing the base 110; and pushing the pistachio 300 into the gap 121 toward the base 110 such that the opposing major surfaces 131 and 132 of the first and second extended portions 120 and 122 pry apart the shells 311 and 312 of the pistachio 300 and the grooves 137 in the first and second sidewalls 135 and 136 receive edges of the nut 310 of the pistachio 300. The nut 310 can then be removed from the gap 121 and eaten or collected with a plurality of the nuts 310 shelled with the pistachio splitter.

In some embodiments, the first and second extended portions 120 and 122 and the base 110 of the pistachio splitter 100 have substantially fixed positions relative to one another. That is, in some embodiments, under the normal forces associated with pushing a pistachio into the gap 121, any movement of the first and second extended portions 120 and 122 and the base 110 relative to one another (e.g., due to any bending or flexing) does not significantly affect the functioning of the pistachio splitter 100. In some embodiments, the pistachio splitter 100 has a unitary construction. That is, the pistachio splitter 100 can be made from a single material with no interfaces between different portions of the pistachio splitter 100.

The pistachio splitter 100 can be made by any suitable process including machining, three-dimensional (3D) printing, or molding (e.g., injection molding), for example. Suitable materials for the pistachio splitter 100 include polymers such as thermoplastic polymers that can be 3D printed or injection molded, for example. In some embodiments, the pistachio splitter 100 comprises a food-grade thermoplastic polymer. Food-grade polymers can be those approved by the U.S. Food and Drug Administration (FDA) as Packaging & Food Contact Substances (FCS). Useful food-grade thermoplastic polymers include polylactic acid (PLA), acrylonitrile butadiene styrene (ABS), high-density polyethylene (HDPE), polyetheretherketone (PEEK), polymethylmethacrylate (PMMA), polycarbonate, polypropylene, or polyethylene terephthalate (PET), for example.

EXAMPLES

A pistachio splitter as generally shown in the figures was made by extrusion-based 3D printing of polylactic acid (PLA) filament. The 3D printer was a Creality Ender 4 Pro (available from Shenzhen Creality 3D Technology Co, Ltd., Shenzhen, China) and the following settings were used: layer height of 0.12 mm, print speed of 80 mm/second, and printing temperature of 225 degrees C. Various dimensions of the pistachio splitter (indicated in the figures) are provided in the following table.

| | |
|---|---|
| W | 7 mm |
| H | 18.2 mm |
| α | 23.5 degrees |
| Ht | 23.9 mm |
| Dt | 24 mm |
| Lt | 41.9 mm |
| H3 | 5.4 mm |
| θ | 30 degrees |
| wg | 1.7 mm |
| dg | 0.7 mm |
| Dr | 3.2 mm |

The pistachio splitter 100 was tested by pushing pistachios 300 into the gap 121 between extended portions 120 and 122 of the pistachio splitter 100. A few of the available pistachios had shells that were completely, or almost completely, closed. These pistachios were not tested. The pistachio splitter 100 was successful in removing the shells from the nut of all of the tested pistachios.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A pistachio splitter for splitting a pistachio, comprising:
    a base extending along orthogonal first and second directions; and
    first and second extended portions extending from the base along a third direction orthogonal to the first and second directions, the first and second extended portions spaced apart along the first direction to define a gap therebetween, each of the first and second extended portions comprising:
    opposing major surfaces spaced apart along the second direction and sloped toward one another along the third direction; and
    sidewalls extending between and connecting the opposing major surfaces,
    wherein the sidewalls comprise a first sidewall of the first extended portion facing the second extended portion and a second sidewall of the second extended portion facing the first extended portion, each of the first and second sidewalls defining an inner sidewall of the gap, the inner sidewall defining a groove therein extending along the third direction, wherein the pistachio splitter is configured such that when the pistachio is inserted into a top portion of the gap opposite the base with an open end-of the pistachio facing the base and the pistachio is pushed into the gap toward the base, the opposing major surfaces of the first and second extended portions pry apart shells of the pistachio and the grooves in the first and second sidewalls receive edges of a nut of the pistachio.

2. The pistachio splitter of claim 1, wherein the base defines a recess therein disposed between the first and second extended portions and configured to receive a tip of a pistachio nut when the pistachio is pushed into the gap toward the base.

3. The pistachio splitter of claim 2, wherein a bottom surface of the recess comprises first and second substantially planar facets meeting along a common edge extending substantially linearly along the second direction.

4. The pistachio splitter of claim 1, wherein the base comprises a bottom major surface and opposing first and second side surfaces coextensive with the bottom major surface along the first direction and sloping upward from the bottom major surface to a bottom of each of the first and second extended portions.

5. The pistachio splitter of claim 4, wherein each of the first and second side surfaces define an acute angle with the bottom major surface.

6. The pistachio splitter of claim 5, wherein at least one of the first and second side surfaces comprises one or more indicia thereon.

7. The pistachio splitter of claim 1, wherein the sidewalls of at least one of the first and second extended portions comprises an outer sidewall opposite the gap, the outer sidewall defining a groove therein extending along the third direction.

8. The pistachio splitter of claim 1, wherein the gap has a bottom portion adjacent the base and an opposite top portion, the bottom portion having a substantially constant width, the top portion having an outwardly sloping width increasing from the substantially constant width along the third direction.

9. The pistachio splitter of claim 8, wherein the bottom portion has a height along the third direction at least 2 times greater than a height along the third direction of the top portion.

10. The pistachio splitter of claim 1, wherein each of the first and second extended portions extend from the base along the third direction to a top portion of the extended portion, the top portion comprising a rounded feature extending between and connecting the first and second major surfaces.

11. The pistachio splitter of claim 1, wherein the pistachio splitter has a unitary construction.

12. The pistachio splitter of claim 11, wherein the pistachio splitter comprises a food-grade thermoplastic polymer.

13. A pistachio splitter, comprising:
    a base extending along orthogonal first and second directions; and
    first and second extended portions extending from the base of the pistachio splitter along a third direction orthogonal to the first and second directions, the first and second extended portions of the pistachio splitter spaced apart along the first direction to define a gap therebetween, the base defining a recess therein disposed between the first and second extended portions, each of the first and second extended portions comprising:
    opposing major surfaces spaced apart along the second direction and sloped toward one another along the third direction; and
    sidewalls extending between and connecting the opposing major surfaces,
    wherein the sidewalls comprise a first sidewall of the first extended portion facing the second extended portion and a second sidewall of the second extended portion facing the first extended portion, each of the first and second sidewalls defining an inner sidewall of the gap, the inner sidewall defining a groove therein extending along the third direction; and
    wherein:
    the gap has a width along the first direction in a range of about 4 mm to about 10 mm;
    the gap has a height along the third direction in a range of about 14 mm to about 22 mm; and for each of the first and second extended portions, the opposing major surfaces define an acute angle therebetween, the acute angle being in a range of about 18 degrees to about 29 degrees.

14. The pistachio splitter of claim 13, wherein the recess has a depth in a range of about 2 mm to about 5 mm.

15. The pistachio splitter of claim 13, wherein the groove of each of the first and second sidewalls has a width along the second direction in a range of about 1.4 mm to about 2 mm.

16. The pistachio splitter of claim 15, wherein the groove of each of the first and second sidewalls has a depth along the first direction greater than about 0.3 mm and less than about 0.7 times the width of the groove along the second direction.

17. The pistachio splitter of claim 13, wherein the base comprises a bottom major surface and opposing first and second side surfaces coextensive with the bottom major surface along the first direction and sloping upward from the bottom major surface to a bottom of each of the first and second extended portions.

18. The pistachio splitter of claim 17, wherein each of the first and second side surfaces defines an angle with the bottom major surface in a range of about 10 degrees to about 50 degrees.

19. The pistachio splitter of claim 13, wherein the first and second extended portions and the base of the pistachio splitter have substantially fixed positions relative to one another.

20. A method of separating shells of a pistachio from a nut of the pistachio using the pistachio splitter of claim 13, the method comprising:
- inserting the pistachio into a top portion of the gap opposite the base with an open end of the pistachio facing the base; and
- pushing the pistachio into the gap toward the base such that the opposing major surfaces of the first and second extended portions pry apart the shells of the pistachio and the grooves in the first and second sidewalls receive edges of the nut of the pistachio.

* * * * *